Dec. 23, 1924.　　W. BAUERSFELD ET AL　　1,520,383

METHOD FOR EXAMINING THE RELATIVE POSITION OF SIGHTING LINES

Filed Aug. 13, 1921

Inventors:
Walther Bauersfeld
Otto Mackensen

Patented Dec. 23, 1924.

1,520,383

UNITED STATES PATENT OFFICE.

WALTHER BAUERSFELD AND OTTO MACKENSEN, OF JENA, GERMANY, ASSIGNORS TO THE FIRM CARL ZEISS, OF JENA, GERMANY.

METHOD FOR EXAMINING THE RELATIVE POSITION OF SIGHTING LINES.

Application filed August 13, 1921. Serial No. 492,117.

(GRANTED UNDER THE PROVISIONS OF THE ACT OF MARCH 3, 1921, 41 STAT. L., 1313.)

*To all whom it may concern:*

Be it known that we, WALTHER BAUERSFELD and OTTO MACKENSEN, citizens of Germany, residing at Jena, Germany, have invented a new and useful Method for Examining the Relative Position of Sighting Lines (for which we have filed an application in Germany, December 28, 1916, Patent No. 306319; Austria, October 5, 1918; Italy, June 25, 1920; France, July 2, 1920, Patent No. 518,725; England, July 8, 1920; and Spain, March 5, 1921), of which the following is a specification.

The present invention relates to a method for examining the relative position of sighting lines which are presented by several telescopes disposed on a common carrier having an oscillating support.

According to the invention for each of the telescopes simultaneously an optical signal lying in the path of the rays is released, at the appearance of which the position is ascertained which in each telescope the image of a target jointly presented to the telescopes has relatively to the sighting mark. This position permits, on the position of the target and the telescope being known, of deducing therefrom the relative position of the sighting lines of the telescopes, and if necessary, this latter position can be adjusted. For instance, in this manner the sighting telescopes of the broadside of a ship can be directed parallelly to each other; this is otherwise difficult owing to the unavoidable oscillations of the ship.

It is preferable to make the said ascertainment in a subjective manner, whereby an observer belongs to each telescope. Optical signals which are particularly suitable for observation result by switching on and off a glow-lamp which is disposed at each telescope, and which either projects into the field of view of the telescope, in front of the telescope-objective, or illuminates the telescope sighting mark. In the latter case the device generally provided for the night-illumination of the sighting mark, may be made use of.

Figure 1:
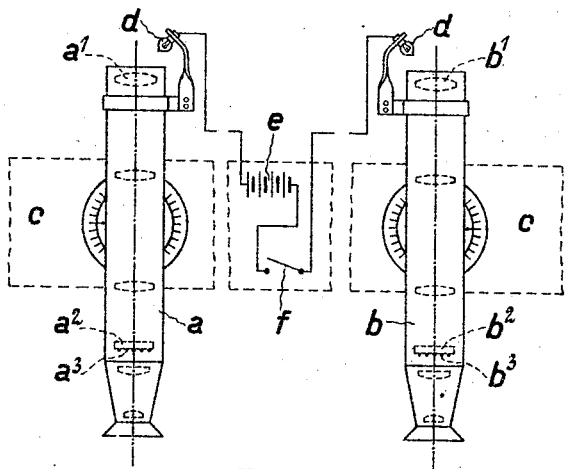
Figure 2:
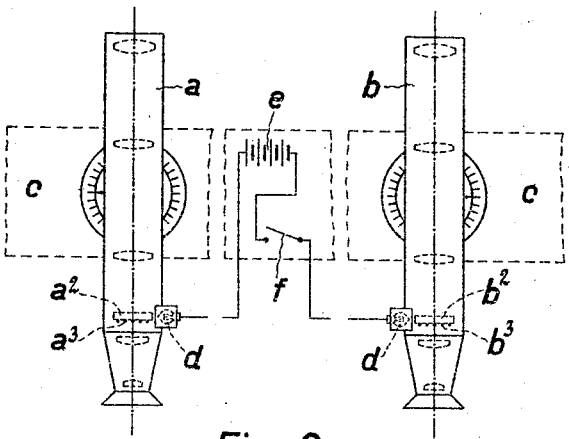

Figs. 1 and 2 show in a plan elevation each a constructional example of a device suited for carrying out the method.

Both constructional examples have in common two terrestrial telescopes $a$ and $b$ which are adjustably supported about a vertical axis each on a carrier having an oscillating base $c$ (e. g. a ship's hull). In order to be able to examine the relative position of the sighting lines of the telescopes, according to Fig. 1 there is connected to each telescope a glow-lamp $d$ in such a way as to project in front of the objective $a^1$ and $b^1$ respectively of the telescope into the field of view of the latter, whilst according to Fig. 2 on each telescope there is disposed a glow-lamp $d$ in such a way as to illuminate a divided disc $a^2$ and $b^2$ respectively of the telescope, on which disc is disposed a horizontal, longitudinal scale $a^3$ and $b^3$ respectively, whose zero-point coinciding with the optical axis of the telescope represents the sighting mark of the telescope. Both in Fig. 1 and Fig. 2 the two glow-lamps $d$ lie in a circuit, of which $e$ is the battery and $f$ the switch.

In order to examine the relative position of the sighting lines, it is necessary to direct in both constructional examples the telescopes to a common target of known distance. By closing the circuit, each observer simultaneously receives a light signal, at the appearance of which he has to ascertain the position of the image of the target relatively to the scale $a^3$ and $b^3$ respectively. From this position and the distance of the target as well as from the distance of the vertical axes of rotation of the telescopes between each other a conclusion may then be drawn to the relative position of the sighting lines of both telescopes.

We claim:

1. Method for examining the relative position of sighting lines which are presented by several telescopes, disposed on a common carrier having an oscillating support, consisting in releasing for each of the telescopes an optical signal lying in the path of rays of each of the said telescopes and ascertaining at the appearance of this signal the relative position which in each of the said telescopes the image of a target jointly presented to the said telescopes has relatively to the sighting mark of the telescope.

2. Method for examining the relative position of sighting lines which are presented by several telescopes, disposed on a common carrier having an oscillating support, consisting in arranging in front of the objective of each of the said telescopes a glow lamp, simultaneously switching on and off these glow lamps and ascertaining the relative position which on the said switching in each of the said telescopes the image of a target jointly presented to the said telescopes has relatively to the sighting mark of the telescope.

3. Method for examining the relative position of sighting lines which are presented by several telescopes, disposed on a common carrier having an oscillating support, consisting in arranging at each of the said telescopes a glow lamp adapted to illuminate the sighting mark of the telescope, simultaneously switching on and off these glow lamps and ascertaining the relative position which on the said switching in each of the said telescopes the image of a target jointly presented to the said telescopes has relatively to the sighting mark of the telescope.

4. Arrangement for examining the relative position of sighting lines which are presented by several telescopes, consisting in a plurality of glow-lamps, each of which is adapted to illuminate the sighting mark of one of the telescopes, a source of current, lines connecting the said glow-lamps and the said source of current, and a switch interposed in these lines and adapted to switch on and off the glow-lamps simultaneously.

WALTHER BAUERSFELD.
OTTO MACKENSEN.